2,736,782

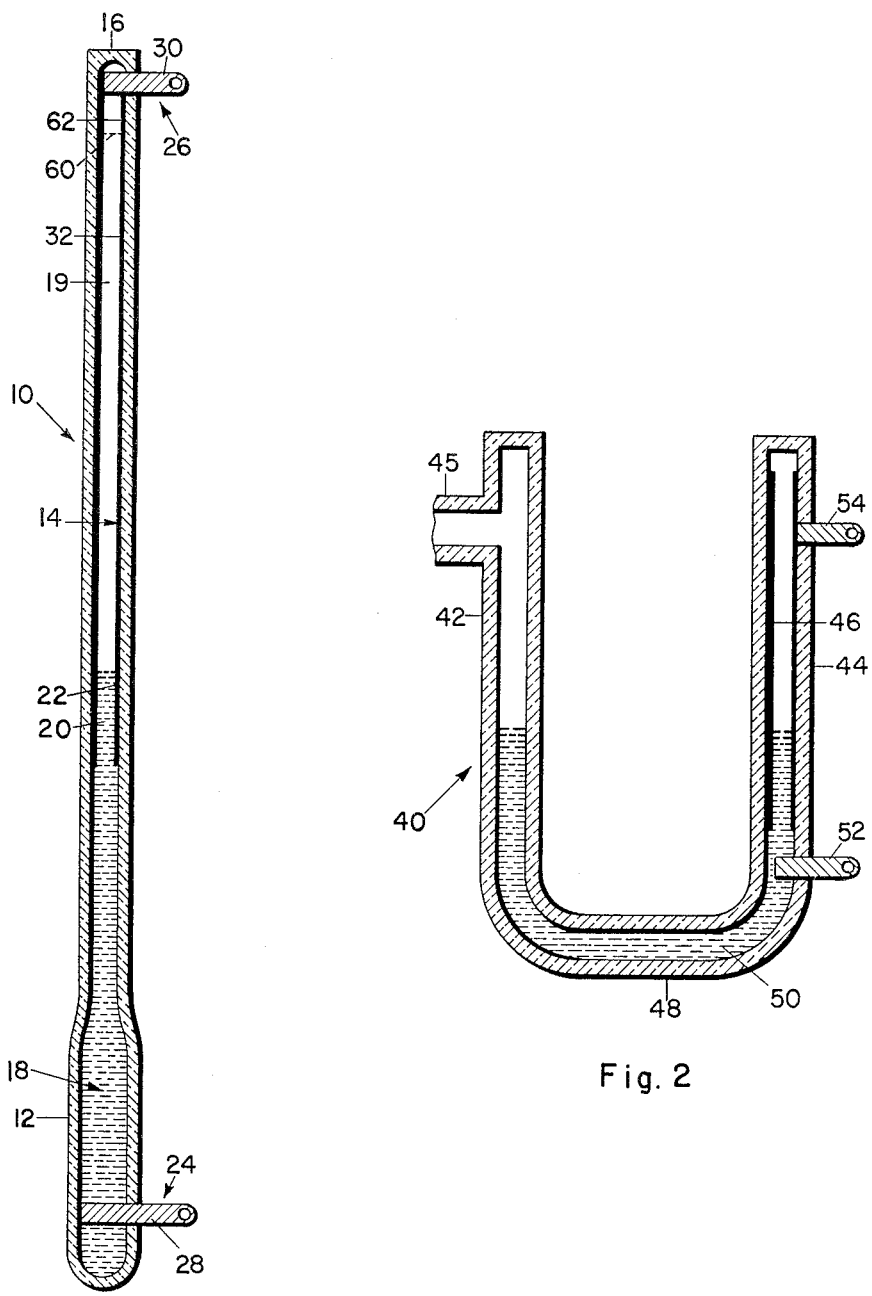

ELECTRICAL INDICATOR

Robert F. Brown, United States Navy

Application June 23, 1953, Serial No. 363,705

4 Claims. (Cl. 201—55)

(Granted under Title 35, U. S. Code (1952), sec. 266)

The invention described herein may be manufactured and used by or for the Government of the United States of America for governmental purposes without the payment of any royalties thereon or therefor.

This invention relates to a novel device for measuring temperature or pressure, particularly at a remote point.

In pilotless aircraft and guided missile work especially, it is often of importance to obtain a knowledge of the meteorological conditions encountered by the craft or missile in flight and/or its internal temperature. In the past thermocouples or bimetal strips, for example, have been employed as temperature indicating devices, which are mechanically connected to rheostats or potentiometers which in turn control radio signals transmitted to a receiving station where this meteorological or temperature intelligence is recorded. The use of prior art devices such as thermocouples for this purpose has proven unsatisfactory because of their sluggishness due to friction and back-lash of their mechanically connected components.

In U. S. Patent 2,210,903 is disclosed one device for solving such problems operating on electrical conductivity principles.

One object of this invention is to provide a simple temperature or pressure measuring device which is especially adapted to measure these characteristics at a remote point.

Another object is the provision of a temperature or pressure measuring device operating in accordance with variations in resistance of certain of its elements.

Still another object is to provide a device particularly suited for measuring temperature or pressure, which is comparatively accurate and reliable in operation, is simple and sturdy in construction, and which is especially adapted for use in pilotless aircraft and guided missiles.

Other objects and many of the attendant advantages of this invention will be readily appreciated as the same becomes better understood by reference to the following detailed description when considered in connection with the accompanying drawings wherein:

Fig. 1 is a cross-sectional view of one embodiment of the invention for measuring temperature, and Fig. 2 is another embodiment of the invention for measurement of pressure.

Briefly, the invention device comprises an elongated tube, which may be a capillary tube, having electrically nonconductive, e. g. glass, walls and a layer of semi-conductive resistive material formed along a portion of the inner surface of the tube. An electrically conductive liquid such as mercury is located in the tube in contact with at least a portion of the resistive material. A first electrode is provided in contact with the liquid, and a second electrode spaced from the first electrode is in contact with the resistive material. The electrodes extend from the interior of the tube externally thereof for connection in an electrical circuit.

As the conductive liquid expands in the tube as result of change in temperature or pressure, it contacts a greater area of the resistive material and causes an increased current flow through the electrodes. The major advantage of the invention device is that the use of a semi-conductive resistive layer or coating of material on the inner wall of the tube provides a considerable electrical resistance so that the amount of current flow is usually of a low order. Hence, the heat generated in the tube by passage of the current through it is very small. The term "semi-conductive resistive" or "resistive" material employed herein is intended to denote a material of high electrical resistance other than a metal. Materials of this type particularly suited for purposes of the invention are carbon and graphite.

In the embodiment shown in Fig. 1, numeral 10 is an elongated glass capillary tube sealed at its ends and having an enlarged portion or bulb 12 at one end. A thin coating of carbon 14 extends along a substantial portion of the inner surface of the tube from a point adjacent the bulb substantially to the opposite end 16 of the tube. A body of mercury 18 is contained in bulb 12 and extends into the tube capillary 19 to a point where a portion 20 of the mercury therein makes contact with a portion 22 of the coating of resistive material adjacent the bulb.

A metallic electrode 24 is positioned in the bulb of the tube and has one end immersed in the mercury in said bulb, the remainder of the electrode passing through the wall of the tube to the outside thereof. Another metallic electrode 26 is positioned at the other end 16 of the tube and has one end in contact with the resistive material coating, the remaining portion of the electrode passing through the tube wall to the outside thereof. Electrical wires or leads, not shown, are adapted to be connected to the ends 28 and 30 of electrodes 24 and 26, respectively, externally of the tube. The glass wall of the tube may have markings or indicia (not shown) thereon for calibration purposes.

In operation of the device of Fig. 1, a rise in temperature of the surroundings will cause the mercury in the tube to expand and rise in the capillary of tube 10, and make contact with a proportionally greater area of resistive carbon coating on the inner walls of the capillary. This increases the length of the current path through the conductive mercury and decreases the length of the path of the current through that portion 32 of the carbon coating free of physical contact with the mercury, and hence the overall resistance of the combined mercury and carbon path between electrodes 24 and 26 is decreased, with the current passing through the tube correspondingly increased. In other words, as the mercury expands in the tube, it "shorts out" more of the resistive carbon coating. Hence, on expansion of the mercury in the tube due to a temperature rise, current and voltage are linearly increased and decreased, respectively. These changes in current and voltage are transmitted to the receiving source either by direct wire or by radio signals.

When the temperature decreases, the opposite effect takes place. Thus, the mercury contracts and makes contact with a smaller area of resistive carbon to shorten the current path through the mercury and increase its path through the carbon. This increases the overall resistance of the combined mercury and carbon path between the electrodes, resulting in a corresponding current decrease. Hence, when the mercury in the capillary contracts due to a decrease in temperature, current and voltage are linearly decreased and increased, respectively, and this change is transmitted to the receiving source.

The device of Fig. 2 illustrates a pressure measuring device utilizing the invention principles. This embodiment includes a U-shaped tube 40 closed at the ends of both its legs 42 and 44. If desired, leg 44 may be open to the atmosphere. An inlet 45 is provided near the top of leg 42 for introducing gas pressure to be measured.

On the inner surface of the other leg 44 is provided a layer of graphite 46 extending from a point adjacent the lower bent portion 48 of the tube near the bottom of leg 44 almost to the top of this leg. A reservoir of mercury 50 is contained in the lower portion of the tube and extends upwardly a distance into both of the legs, the mercury in leg 44 covering the lower portion of the graphite layer therein. A lower electrode 52 is located at the bottom of leg 44 below the graphite coating and extends into the body of mercury, while an upper electrode 54 is positioned near the top of leg 44 and makes contact with the graphite layer at the top thereof, both of these electrodes extending externally of the tube and being adapted for connection into an electrical circuit (not shown).

In operation of the device of Fig. 2, an increase in pressure applied through inlet 45 to leg 42 of the tube results in a lowering of the mercury in this leg and a rise in the mercury in leg 44, bringing the mercury therein into contact with a greater area of the graphite layer. As previously explained in connection with the operation of the device of Fig. 1, the resistance to the flow of electric current through leg 44 between the electrodes is accordingly decreased, proportionally increasing the current and decreasing the voltage. When the pressure in leg 42 is decreased, the mercury column therein rises and the column of mercury in leg 44 is lowered, thus reducing the area of contact of the graphite layer therein with the mercury. This increases the electrical resistance of the current path between electrodes 52 and 54, and proportionally decreasing current flow and increasing the voltage therebetween.

It is significant that in the devices of Figs. 1 and 2 the length of the semi-conductive resistive element and the length of the tube in which such element is located are so adjusted that the length of the mercury column in contact with such element is not permitted to expand during operation of these devices to a point where the mercury covers that portion of the resistive element in contact with electrodes 26 or 54 in the devices of Figs. 1 and 2, respectively. In other words, the devices are designed so that the electrically conductive fluid therein is not allowed to expand the full length of the resistive element between the two electrodes. In this manner, even though this liquid expands to a point, as shown by the dotted line 60 in Fig. 1, where only a small portion 62 of the resistive element between the liquid and the electrode 26 connected to such element is free from contact with such liquid, the resistance of this small portion 60 is still sufficiently large to prevent comparatively large current flow and attendant heat generation in the device. It is noted that the voltage developed across the electrodes of the invention device under the various conditions of operation is comparatively small, usually.

Tubes 10 and 40 of the devices illustrated in the drawing may be constructed of nonconductive or dielectric materials other than glass, e. g. porcelain or plastics. Conductive liquids other than mercury may also be employed. Further, the length of the semi-conductive resistant layer or element can be selected to correspond with the magnitude of the temperature or pressure to be measured.

From the foregoing, it is apparent the invention provides a simple, efficient temperature or pressure recording device which is especially adapted for measurement of these characteristics at a remote point. The semi-conductive resistant element employed therein in conjunction with the conductive liquid provides a varying electrical path having a resistance such that the current passing therethrough is insufficient to generate comparatively large amounts of heat. The device provides a linear current or voltage change for change in length of the column of conductive liquid and is comparatively accurate and reliable.

Obviously many modifications and variations of the present invention are possible in the light of the above teachings. It is therefore to be understood that within the scope of the appended claims the invention may be practiced otherwise than as specifically described.

I claim:

1. A device for measuring temperature which comprises an enclosed elongated tube having electrically non-conductive walls, a coating of semi-conductive resistive material formed along a substantial portion of the inner surface of said tube, an electrically conductive liquid filling one end of said tube, a portion of said liquid being in contact with a portion of said resistive material adjacent said one end of said tube, a first electrode in contact with said liquid near said one end of said tube and a second electrode spaced from said first electrode and in contact with said resistive material, said tube and said coating being so constructed and arranged that said liquid is spaced at all times from that portion of the coating which is in contact with said second electrode, said electrodes extending from the interior of said tube externally thereof.

2. A device for measuring temperature which comprises an enclosed glass capillary tube having a bulb at one end, a coating of semi-conductive resistive material formed along a substantial portion of the inner surface of said tube, a body of mercury filling said bulb and extending within said tube to a point where said mercury is in contact with a portion of the coating of said resistive material, a first electrode immersed in the mercury in said bulb and a second electrode at the other end of said tube in contact with said resistive material, said tube and said body of mercury being so constructed and arranged that said mercury is spaced at all times from that portion of the coating which is in contact with said second electrode, said electrodes extending from the interior of said tube exteriorly thereof.

3. A device as defined in claim 2, wherein said resistive material is of the group consisting of carbon and graphite.

4. A device for measuring temperature or pressure which comprises an elongated tube having electrically nonconductive walls, a layer of semi-conductive resistive material of the group consisting of carbon and graphite formed along a portion of the inner surface of said tube, an electrically conductive liquid in said tube in contact with at least a portion of said resistive material, a first electrode in contact with said liquid and a second electrode spaced from said first electrode and in contact with said resistive material, said electrodes extending from the interior of said tube externally thereof.

References Cited in the file of this patent

UNITED STATES PATENTS

| 1,819,849 | Stearns | Aug. 18, 1931 |
| 2,566,369 | Putman | Sept. 4, 1951 |